United States Patent

Gibson

[15] 3,649,750

[45] Mar. 14, 1972

[54] CONTROL SIGNAL GENERATING APPARATUS TO PERMIT RELIABLE SELECTION OF TRANSMITTED TELEVISION MESSAGE INFORMATION

[72] Inventor: J. James Gibson, Princeton, N.J.

[73] Assignee: RCA Corporation, New York, N.Y.

[22] Filed: Oct. 21, 1970

[21] Appl. No.: 82,692

[52] U.S. Cl. ........................................178/5.6, 178/DIG. 23

[51] Int. Cl. ..........................................................H04n 7/00

[58] Field of Search..............................178/5.6, 5.8, DIG. 23

[56] References Cited

UNITED STATES PATENTS

| | | | |
|---|---|---|---|
| 3,491,199 | 1/1970 | Weinstein et al. | 178/5.6 |
| 3,493,674 | 2/1970 | Houghton | 178/DIG. 23 |
| 3,507,985 | 4/1970 | Breukink et al. | 178/5.6 |
| 3,551,591 | 12/1970 | Nakamura et al. | 178/5.6 |

*Primary Examiner*—Robert L. Richardson
*Attorney*—Eugene M. Whitacre

[57] ABSTRACT

Digital logic apparatus operates in response to the line and field scanning rate pulses present in a broadcast television signal to generate a control signal which synchronizes the count-down system of my copending application Ser. No. 82,593, filed Oct. 21, 1970 and entitled, "Apparatus Permitting Reliable Selection of Transmitted Television Message Information." Whereas the system of such application transmitted a control signal to effect the synchronization, the present apparatus generates such control from the broadcast signal itself, without the need for additional signal generation and transmission.

5 Claims, 6 Drawing Figures

INVENTOR.
J. James Gibson
BY
Charles Bradley
ATTORNEY

INVENTOR.
J. James Gibson
BY Charles Brodsky
ATTORNEY

INVENTOR.
J. James Gibson
BY Charles Brodsky
ATTORNEY

INVENTOR.
J. James Gibson
BY
Charles Bradley
ATTORNEY

INVENTOR.
J. James Gibson
BY
Charles Brodsky
ATTORNEY

CONTROL SIGNAL GENERATING APPARATUS TO PERMIT RELIABLE SELECTION OF TRANSMITTED TELEVISION MESSAGE INFORMATION

BACKGROUND OF THE INVENTION

1. Field of the Invention

This invention relates to the transmission of special message information to the public using existing television facilities, without interfering with regular television program service. More particularly, it relates to the generation of a "flag" signal in response to the line and field scanning rate pulses present in the standard television signal. Such "flag" signal can be utilized to enable reliable recovery at a television receiver of selected messages for reproduction.

2. Description of the Prior Art

A system which accomplishes transmission of special messages is disclosed in U.S. Pat. No. 3,493,674. One embodiment of the system therein described sequentially multiplexes message representative line-scan video signals developed by an auxiliary pickup camera with primary program video signals developed by a studio pickup camera during predetermined portions of the vertical blanking interval thereof, at a rate of one line-scan signal per message per field of program information. More specifically, those video message signals are inserted during a time interval corresponding to that between successive horizontal synchronizing pulses within the vertical blanking interval of each program field. The composite signal is then transmitted to the home receiver in the usual manner, where apparatus is additionally included to separate the message signals from the rest of the received signals. The separated message signals may be recorded using a thin window-type cathode-ray tube and an associated electrophotographic printer, while the primary program signals are displayed on the kinescope of the home receiver in the conventional way.

A second embodiment of the system described in U.S. Pat. No. 3,493,674 transmits the auxiliary message information during the picture interval of the television signal rather than during its blanking interval. Apparatus is described by means of which the receiver counts to the particular line in the television frame in which the information is inserted for subsequent recovery and reproduction in hard-copy format. While such an arrangement is generally not compatible with existing television equipment in that it uses those active lines for the auxiliary message as are used for the primary program information, the embodiment discloses the use of a simple switching scheme to control the television studio equipment to select the one of the two types of information which is to be transmitted.

As is described in my pending application Ser. No. 82,593, filed 10-21-70, and entitled, "Apparatus Permitting Reliable Selection of Transmitted Television Message Information," one of the prime concerns in constructing such embodiment is the reliable selection at the receiver of that particular portion of the vertical blanking interval or that active line which contains the auxiliary message desired to be reproduced. It was there noted that if the desired message were missed, the overall information display would not be entirely correct; and the problem would be much worse in those instances where category code signals-additionally transmitted during television line intervals to identify the location of message content were the information missed, so that reproduction of an entirely incorrect message could result. To insure against such happenings, the apparatus disclosed in such aforesaid application, operated to generate a "flag" signal which was transmitted along with the broadcast television signal; the purpose of this additional signal was to synchronize a digital countdown circuit at the receiver by providing a stable timing reference from which the apparatus counted to reach the desired line interval having the auxiliary message information to be reproduced. As furthermore described, the "flag" signal was transmitted at a point in the "EVEN" interlaced television field which had little future potential for auxiliary message use as the corresponding interval of the transmitted "ODD" television field was split by an equalizing pulse.

SUMMARY OF THE INVENTION

As will become clear hereinafter, apparatus according to the present invention represents an improvement over that described in my copending application Ser. No. 82,593, in that the composite synchronizing signal itself is used to develop the "flag" signal; the need for generating and transmitting such a special signal as part of the television broadcast is therefore obviated. As will be seen, pulse detection apparatus is included to detect whether the composite synchronizing signal represents an "ODD" or "even" interlaced television field, while digital countdown apparatus is included to develop a "flag" at a predetermined position in the television frame based upon this detection. Such apparatus is conditioned to operate with respect to the leading edge of the horizontal synchronizing pulses of the television signal waveform so as to be substantially independent of those time differences which exist in the leading edge of the vertical synchronizing pulse due to the characteristics of interlace action and accepted tolerance variations. In one embodiment of the invention to be described, the detection apparatus senses the occurrence of the "ODD" interlaced field by responding only to the presence of an internally generated pulse train which conforms to that sequence of pulses which occurs on an "ODD" field. In response to such presence, an output signal is generated immediately after the vertical synchronizing pulse interval to serve as the "flag" by means of which the message line selection can be reliably controlled. Alternative arrangements can provide the output "flag" at other positions within the "ODD" interlaced field, or at selected positions within the "EVEN" interlaced field, for that matter. With such arrangements, more reliable line selection would result in that correct "flag" signals would occur far more often than in the system of my Ser. No. 82,593 case, and no need would exist to acquire Federal Communications Commission approval for the "flag" signal transmission there described.

BRIEF DESCRIPTION OF THE DRAWINGS

These and other advantages of the instant invention will become apparent from a consideration of the following detailed description of a preferred embodiments thereof in which.

DETAILED DESCRIPTION OF THE INVENTION

Figure 1:
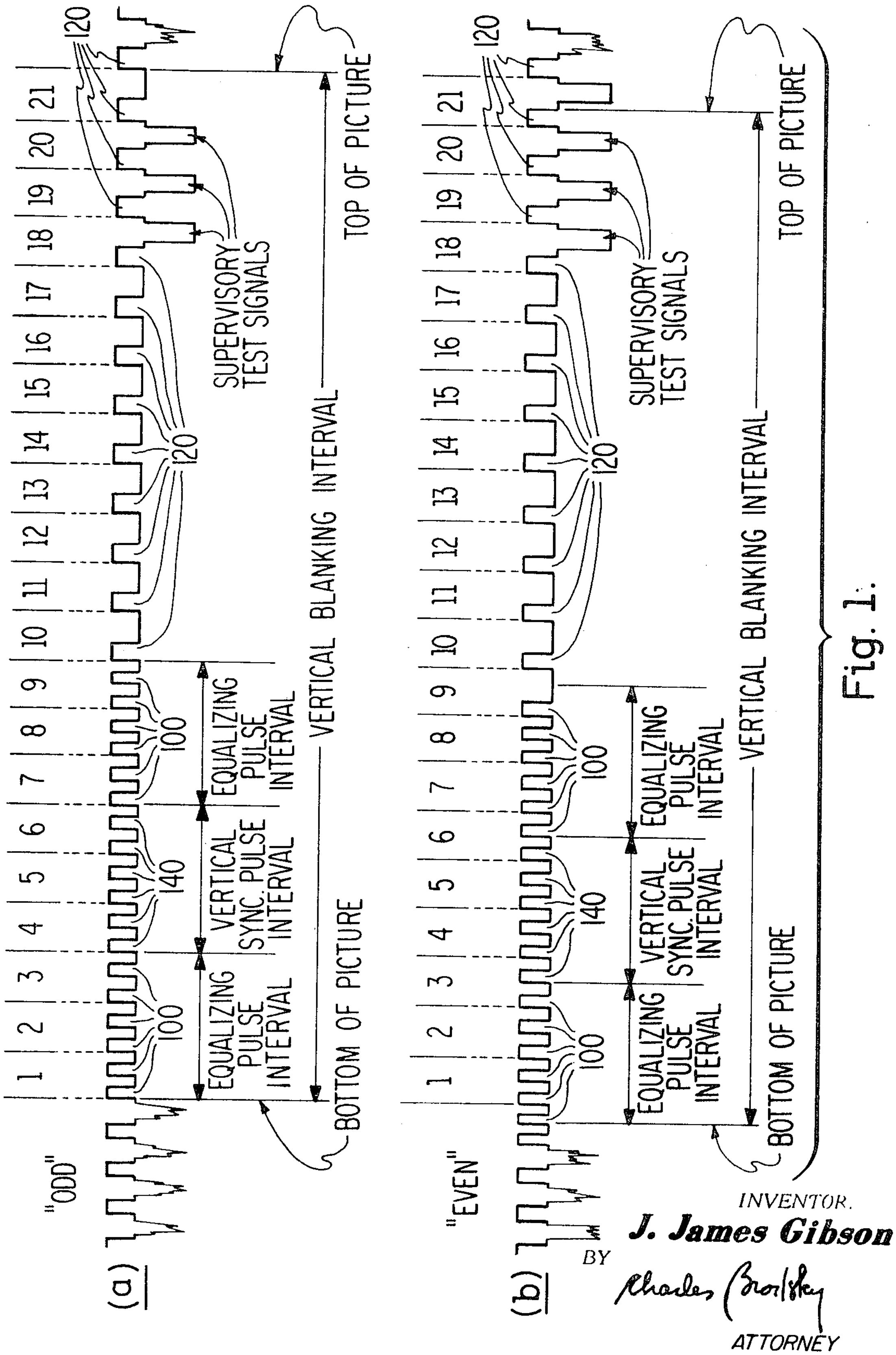
FIG. 1 is a series of curves illustrating the vertical blanking interval for alternate fields of an interlaced television signal.

Referring now to FIG. 1 in more detail, the curves (*a*) (*b*) there shown illustrate respectively the vertical blanking interval for the two alternate fields of the interlaced television signal used in the United States. As is well known, each of these intervals include equalizing pulses 100, horizontal synchronizing pulses 120, and serrated vertical synchronizing pulses 140. The equalizing pulses 100 function to maintain vertical synchronization of a television receiver even though two interlaced scanning fields are utilized, while the horizontal synchronizing pulses 120 maintain horizontal synchronization of the receiver during the latter portion of each of the vertical blanking intervals. The serrated vertical synchronizing pulses 140 maintain horizontal synchronization of the receiver during the vertical synchronizing pulse.

The composite synchronizing signal depicted in waveforms FIG. 1 (*a*) and 1 (*b*) is also used to synchronize the horizontal deflection in the thin window cathode-ray tube of the above-described television message system receiver. When used in such an environment, the composite synchronizing signal additionally includes auxiliary video message signals located, for example, in that space in the vertical blanking interval indicated in waveforms (*a*) and (*b*) by the numeral "16." Message identifying category code signals might further be included, in that space denoted "15," for example, as described in U.S. Pat. No. 3,493,674. Such code signals will be seen to be inserted within an earlier time interval than its associated message so that transmission of a code signal of frequency $f_1$, for example, in horizontal interval "15" may indicate the transmission of stock market information will follow in the succeeding interval "16." Transmission of a code signal of frequency $f_2$ in interval "15" may then indicate the transmission of civil defense information will be forthcoming in interval "16," or within the active line interval as well, as described in the aforesaid patent.

As is described in pending application Ser. No. 82,593, one disadvantage of the U.S. Pat. No. 3,493,674 system is that recovery of message information is had with respect to the leading edge of the vertical synchronizing pulse, and that such leading edge may vary by as much as a one-half horizontal line interval under accepted tolerances. In addition, a one-half horizontal line interval exists between the leading edge of the vertical synchronizing pulse with respect to corresponding horizontal pulses in the alternating "EVEN" and "ODD" interlaced fields. Such time differences were noted in that pending application as presenting the possibility that a streak of wrong information might be reproduced in the output of an electrophotographic printer in place of that wished to be reproduced and that an entirely incorrect message could be reproduced. To reduce such possibilities, the apparatus of that application provided for the transmission of a "flag" signal during the "EVEN" interlaced field--to generate a timed gating signal accurately aligned with respect to the beginning of horizontal sync rather than with the beginning of vertical sync for mixing with the incoming video signal to recover the desired message. The "flag" was described as being unreliable in the sense that the responding circuits dismissed present, but weak, "flag" signals but reliable in the sense that the strong signal required to energize the responding apparatus reduced the probability of occurrence of false indications.

Figure 2:
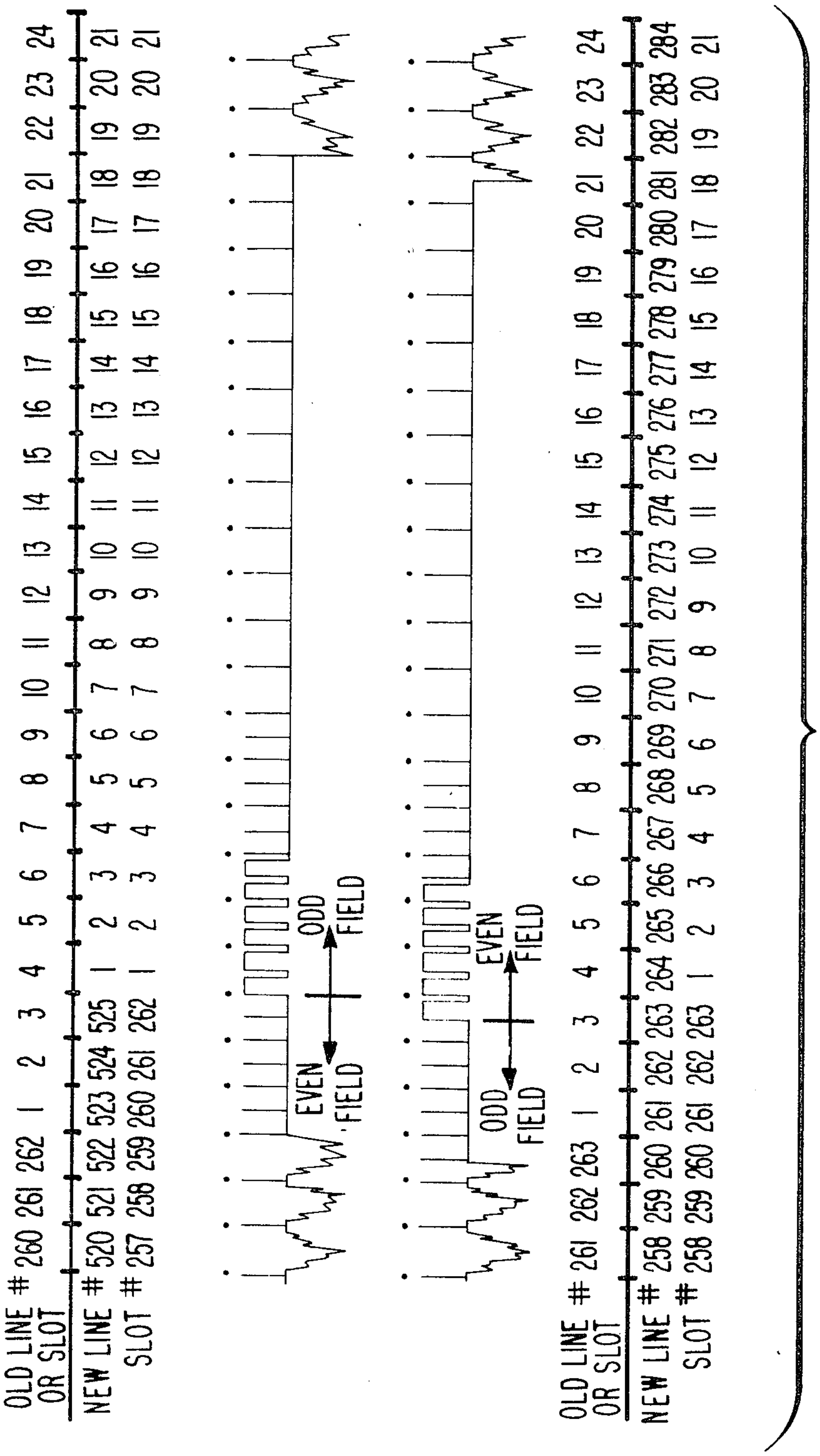
FIG. 2 is a series of simplified curves of the interlaced signal useful in describing the invention.

Pending application Ser. No. 82,593 also sought to define a line and slot numbering system by which message locations in the transmitted television signal could be identified, and such numbering system also applies to the apparatus of the present invention. Thus, it will be seen from the waveforms of FIG. 1 herein that the "ODD" interlaced field can be identified by the fact that the leading edge of the vertical synchronizing pulse coincides with the leading edge of a horizontal synchronizing pulse, while the "EVEN" field can be identified by the fact that the leading edge of the vertical synchronizing pulse comes between two successive horizontal pulses. The first line of an "ODD" television field can then be defined as the first line following the coincidence of the leading edges of its vertical and horizontal synchronizing pulses. The first line of the "EVEN" field, on the other hand, comes 263 horizontal lines later, i.e., the leading edge of vertical sync comes 262 one-half lines later in the middle of television line 263. If the first slot into which an auxiliary message is to be inserted is defined as starting with the first horizontal synchronizing pulse which coincides with the serrated vertical synchronizing pulse, then the line numbers and slot numbers are the same for the "ODD" interlaced field while the line number for the "EVEN" field equals the slot number pulse 263. Thus, slot 1 corresponds to line 1 for an "ODD" field, and corresponds to line 264 for the "even" field. Slot 2 similarly corresponds to line 2 of the television frame for the "ODD" field, and corresponds to line 265 for the "EVEN" field. With this convention, the "ODD"interlaced field contains 263 slot starts while the "EVEN" field contains only 262 slot starts. Such identification can be seen from the simplified waveforms of FIG. 2, where the identifying label "OLD" defines the numbering system employed in U.S. Pat. No. 3,493,674 while the label "-NEW" defines the numbering system used herein. Whereas such definition was utilized in the aforenoted application to describe a "flag" signal transmission in slot 6 of the "even" interlaced field-corresponding to line 269 of the television frame-such definition will be utilized with the apparatus of the present invention to internally generate a "flag" signal in slot 4 of the "ODD" interlaced field corresponding to line 4 of the television frame.

Figure 3:
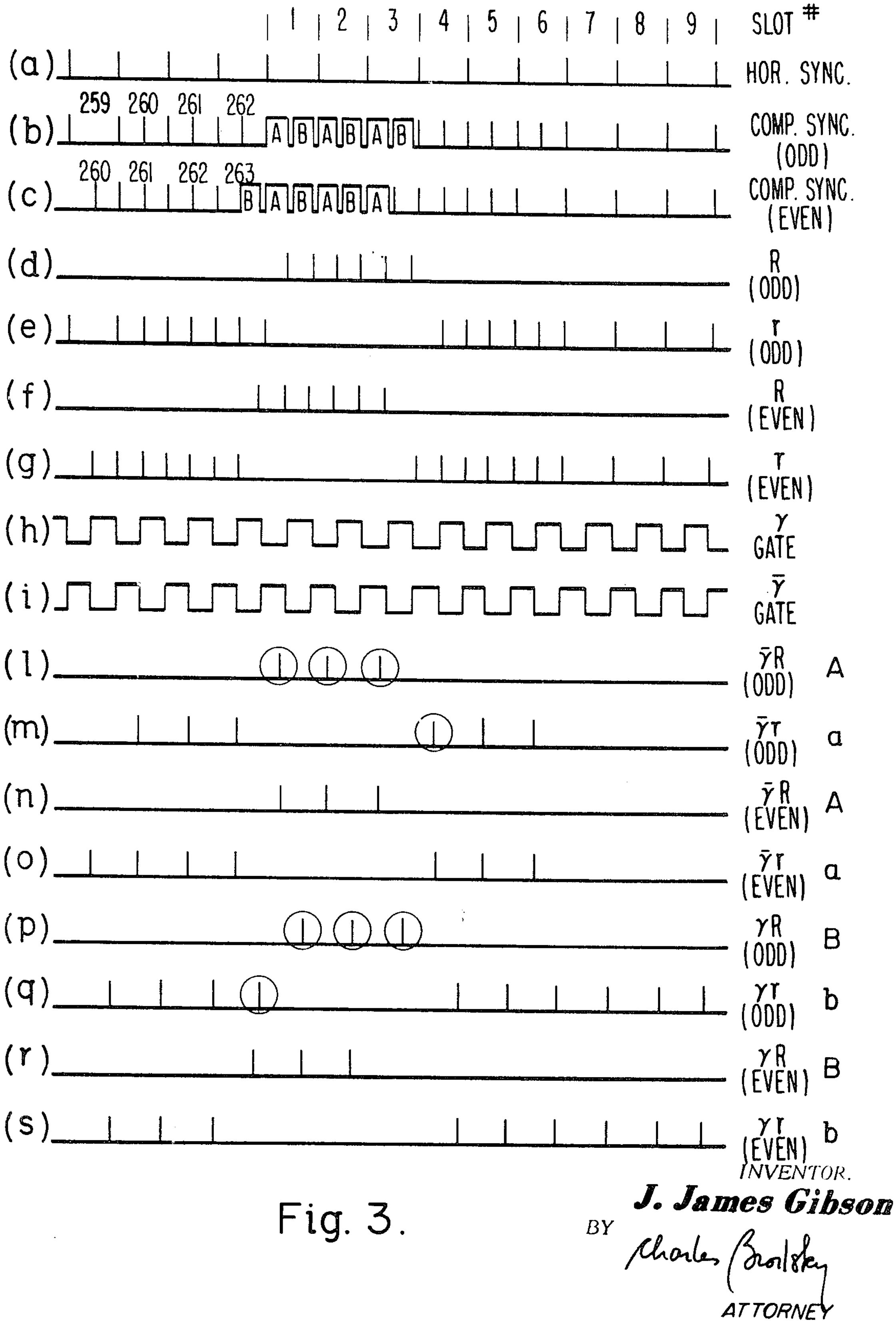
FIG. 3 is a second series of curves useful in describing the detection operation of the invention.

The simplified curves of FIG. 3 show such slot numbering with respect to the horizontal synchronizing pulses in waveform (*a*). Waveforms (*b*) and (*c*) show the composite television synchronizing signal for both the "odd" and "even" interlaced field, with particular emphasis being placed on the vertical synchronizing interval. As noted, the 6 successive pulses in the vertical synchronizing interval are each slightly less than one-half H in duration, and are located differently with respect to the horizontal synchronizing pulses depending on whether the field is "odd" or "EVEN." On the "ODD" field, the first of the six vertical synchronizing pulses covers the first half of a horizontal scanning line, while on the "EVEN" field, the first such pulse covers the second half of a scanning line. For purposes of the discussion that follows, those vertical synchronizing pulses which appear in the first half of the line will be referred to as "A" pulses while those which appear in the second half of a line will be referred to as "B" pulses. For the slot numbering system indicated, it will be seen that the "A" pulses remain in the same position on both "ODD" and "EVEN" fields, whereas the "B" pulses appear one slot earlier on "EVEN" fields than they do on "ODD" fields. Thus, as will be seen, on "ODD" fields the sequence starts in slot 1 in the order ABABAB. Correspondingly, the sequence starts on "EVEN" fields in the middle of slot 263 in the order BABABA. The "A" pulses fall in the slots 1, 2 and 3 repetitively, while the "B" pulses fall in slots 1, 2 and 3 on "ODD" fields and in slots 263, 1 and 2 on "EVEN" fields. If a receiver system were to generate a trigger, for example, at the end of the third "B" pulse of an ABABAB sequence, such trigger will occur at the end of slot No. 3 in "ODD" fields, to identify line No. 3 in a 525 line frame. If the receiver were to generate the trigger at the end of the third "B" pulse of a BABABA sequence, such trigger will occur at the end of slot No. 2 in "EVEN" fields, to identify line No. 265 in such a television frame.

In accordance with one embodiment of the present invention, a "flag" signal is internally generated by the apparatus of the invention during the fourth line of an "ODD" interlaced field, i.e., immediately after the vertical synchronizing interval. The sequence of vertical synchronizing pulses on such field is ABABAB, so that to interpret the "EVEN" field sequence BABABA as an "ODD" field would require at least the missing of the first "B" pulse of the "EVEN" field sequence and an error in providing a false alarm "B" indication after the last "A" pulse. To reduce the probability of falsely interpreting the "EVEN" field sequence BABABA as the desired "ODD" field sequence ABABAB, the apparatus of the invention is designed to detect the sequence ABABAB together with the absence of a preceding "B" pulse, or *b*, together with the absence of a trailing "A" pulse, or *a*.

If the probability of missing the first "B" pulse of the even field sequence is called "*q*" and the probability of falsely indicating the inclusion of a "B" pulse as "*p*," the probability *P* that an "EVEN" field sequence would provide an output "-flag" in the fourth "even" field is given by the expression:

$$P=p(1-p)\,q\,(1-q)^5$$

and the probability *Q* of missing the desired trigger on "ODD" fields is given by:

$$Q= 1=(1-q)^6\,(1-p)^2$$

If, due to noise, for example, $p=10^{-3}$ and $q=10^{-1}$, then $P= 6 \times10^{-5}$ and $Q= 0.47$. Under these conditions, a correct trigger will be received, on the average, about every other frame, which would be sufficient to check a line counter and set it in the manner described in my copending application after a nonsynchronous camera switch at the transmitter. The probability of having to wait more than four frames to lock in after such a camera switch would be $Q^4= 1/20$. An incorrect trigger would be received, then about once every 10 minutes. On the other hand, if the receiver requires two triggers for setting the line counter, the probability of such false resetting would drop to $3.6 \times10^{-11}$, while the probability that the locking time would exceed four television frames would be one-eighth, which may be acceptable in some instances.

Figure 4:
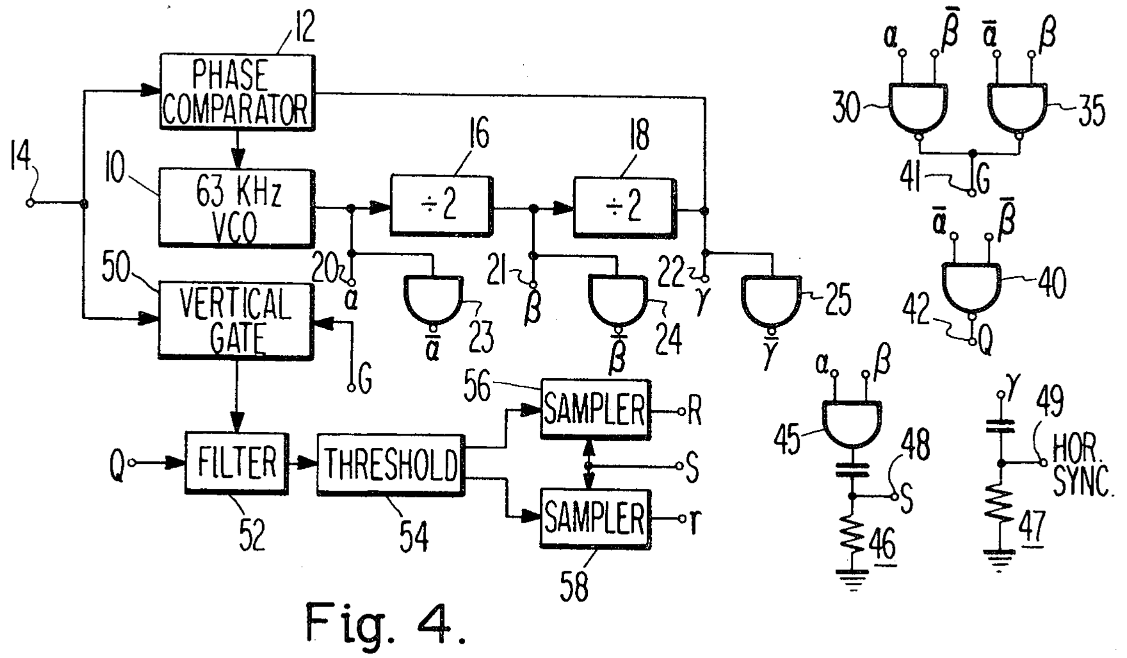
FIG. 4 is a block diagram, partially in digital logic format, of illustrative apparatus for generating various ones of the curves shown in FIG. 3.

Before considering the bock diagram of FIG. 4 which represents one portion of the apparatus of the invention, it would be first advantageous to consider the following waveforms of FIG. 3. Thus, waveform (*d*) illustrates those times within the composite synchronizing waveform at which the trailing edge "R" of the synchronizing pulses occur for the "ODD" interlaced field, while the absence of such pulses "*r*" are shown in waveform (*e*). Waveforms (*f*) and (*g*) show the comparable instance for the presence of trailing edge pulses "R" and the absence of such pulses "*r*" for the "EVEN" interlaced field. Also shown in FIG. 3, waveform (*h*), is a gating or sampling pulse $\gamma$ derived from the apparatus of FIG. 4 for providing indications as to the presence and absence of the "A" and "B" pulses of the "ODD" and "EVEN" field sequences of the composite television signal. Waveform (*i*) shows the $\gamma$ waveform (*h*) inverted to $\bar{\gamma}$.

Lastly in FIG. 3: waveforms (*l*) and (*m*) respectively represent the presence A and absence a of the "A" vertical synchronizing pulse for the "ODD" interlaced field, obtained by "anding" the inverted gate pulse $\bar{\gamma}$ of waveform (*i*) with the "R" and "*r*" waveforms (*d*) and (*e*); waveforms (*n*) and (*o*) respectively represent the presence A and absence a of the "A" vertical synchronizing pulse for the "EVEN" interlaced field, obtained by adding the inverted $\bar{\gamma}$ gate waveform (*i*) with the "R" and "*r*" waveforms (*f*) and (*g*); waveforms (*p*) and (*q*) respectively represent the presence B and absence *b* of the "B" vertical synchronizing pulse for the "ODD" interlaced field, obtained by "anding" the $\gamma$ gate waveform (*h*) with the "R " and "r" waveforms (*d*) and (*e*); while waveforms (*r*) and (*s*) respectively represent the presence B and absence *b* of the "B" synchronizing pulse for the "EVEN" interlaced field obtained by "anding" the $\gamma$ gate waveform (*h*) with the "R" and "*r*" waveforms (*f*) and (*g*). The significance of these latter waveforms and the method of their being obtained will be seen below.

Referring now to FIG. 4, a voltage controlled oscillator 10 is shown for providing square wave pulses at four times the horizontal scanning rate, or 63 kHz. A phase comparator 12 is also shown, to compare the phase of a composite synchronizing signal supplied at input terminal 14 with a square wave obtained from the oscillator 10 to synchronize the phase and frequency of the oscillator. The square wave signal from the oscillator 10 is divided in frequency by a first counter 16 and then by a further counter 18 to provide output square waves from the unit 16 at one-half the oscillator rate and at one-fourth the oscillator rate, respectively. As noted, phase comparator 12 samples the output of the counter 18 with the horizontal synchronizing pulses supplied at terminal 14 to effect any phase correction of the oscillator 10 which may be necessary.

Figure 5:
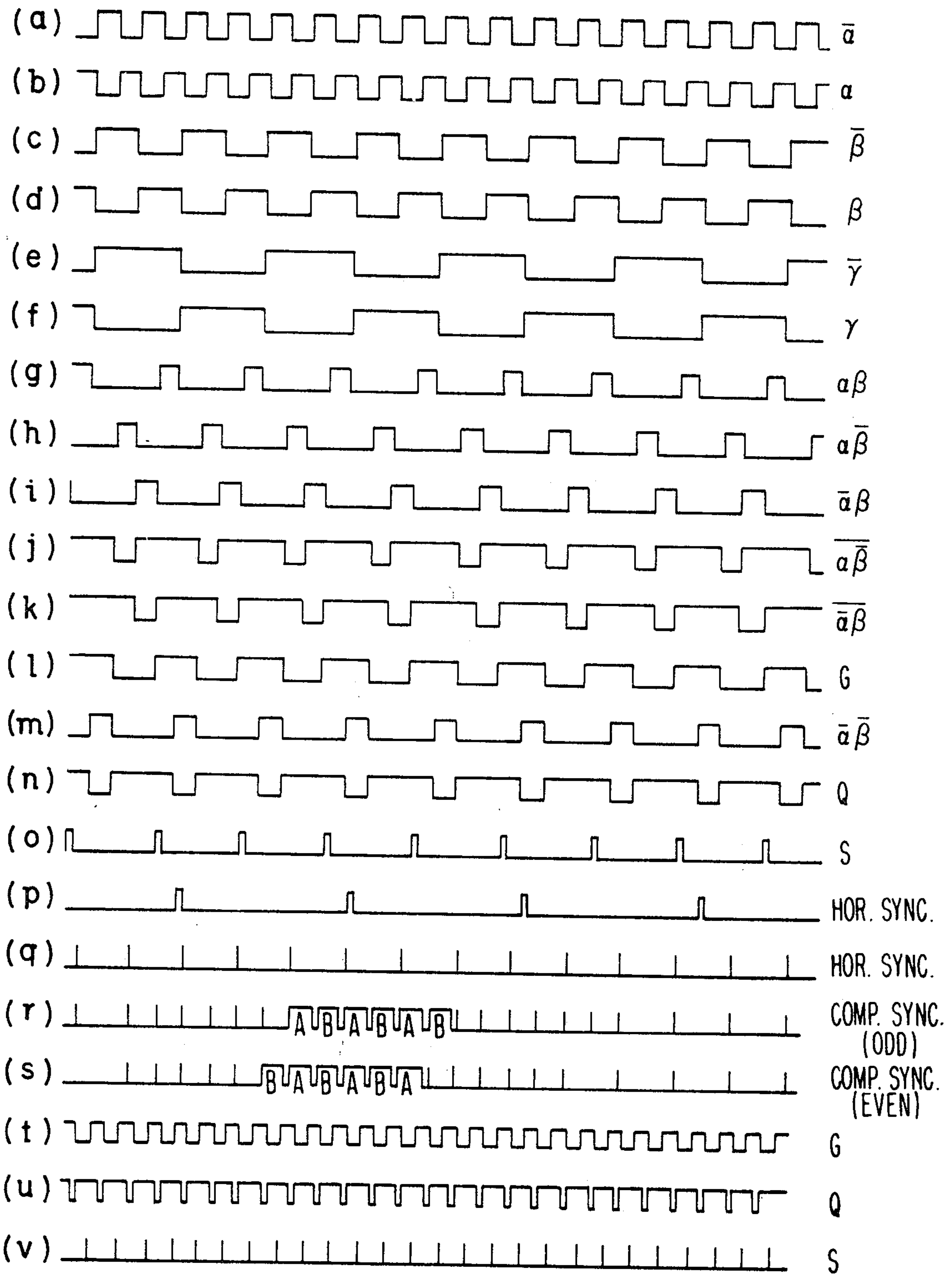
FIG. 5 is a series of curves illustrating signal waveforms present at selected points in the block diagram of FIG. 4.

Three terminals 20–22 and three inverter circuits 23–25 are included to provide both polarities of the square wave signals present in the circuit as thus far described. In particular, terminal 20 and inverter 23 are connected to the output of the oscillator 10, terminal 21 and inverter 24 are connected to the output of counter 16, and terminal 22 and inverter 25 are connected to the output of counter 18. The form of the signal $\gamma$ developed at terminal 20 is shown in FIG. 5(*b*) while the form of the signal $\bar{\alpha}$ developed by inverter 23 is shown in FIG. 5(*a*). Similarly, the form of the signal $\beta$ developed at terminal 21 is shown in FIG. 5(d) while the form of the signal $\bar{\beta}$ developed by inverter 24 is shown in FIG. 5(*c*). Lastly, the form of the signal $\gamma$ developed at terminal 22 is shown in FIG. 5(*f*) while the form of the signal $\bar{\gamma}$ developed by inverter 25 is shown in FIG. 5(*e*).

Three NAND circuits-30, 35, and 40 are also shown in the arrangement of FIG. 4. As indicated, the circuit 30 is supplied with the input signal $\alpha$ developed at terminal 20 and with the signal $\bar{\beta}$ developed by inverter 24. These signals are added by NAND 30 to be of the form shown in FIG. 5(*h*) and then inverted to be of the form shown in FIG. 5(*j*). In analogous manner, the NAND-circuit 35 is supplied with the $\bar{\alpha}$ signal from inverter 23 and the $\beta$ signal from terminal 21, to add those signals into one having the waveform shown by FIG. 5(*i*) and to invert the sum to provide the waveform shown in FIG. 5(*k*). The output signals from the units 30 and 35 are then added together at terminal 41 to provide a signal G of the waveshape shown in FIG. 5(l).

The NAND circuit 40 similarly receives as an input the signal $\bar{\alpha}$ developed by inverter circuit 23 along with the signal $\bar{\beta}$ developed by inverter 24. These signals are added in the circuit 40 to provide a waveform of the type shown in FIG. 5(*m*), before further inversion by the circuit 40 to appear at its output terminal 42 as the signal waveform Q shown in FIG. 5(*n*).

An AND-circuit 45 and a pair of resistance-capacitor differentiating circuits 46, 47 are also included in the apparatus of FIG. 4. As noted, the AND-circuit 45 receives the input signal $\alpha$ developed at terminal 20 and shown in FIG. 5(*b*) and the input signal $\beta$ developed at terminal 21 and shown in FIG. 5(*d*). These signals are added by the unit 45 to appear as shown in FIG. 5(*g*), with the resultant signal being then differentiated by the unit 46 to appear at output terminal 48 as the signal S shown in FIG. 5(*o*). The differentiating circuit 47, on the other hand, receives the signal input $\gamma$ signal shown in FIG. 5(*f*) and processes it to an output signal denoted "-HOR.SYNC." at output terminal 49, as shown in FIG. 5(*p*).

The generation of the G, Q and S signals from the digital logic described above will be seen to be utilized in the derivation of the "R" and "*r*" signals shown in FIG. 3. To this end, the composite signals developed at terminal 14 in FIG. 4 are coupled to a gate circuit 50 to which the G signals developed at terminal 41 are also coupled. FIG. 5(*q*) shows the timing of the horizontal synchronizing pulses developed at terminal 49 (at a scale different from that of FIGS. 5(*a*)–5(*p*)) while while FIG. 5(*r*) and 5(*s*) show reproductions of the composite synchronizing signals of FIGS. 3(*b*) and 3(*c*) for the "ODD" and "EVEN" interlaced television fields. FIG. 5(*t*) shows the waveform G coupled to the gate unit 50 and is identical to that shown in FIG. 5(l), but also on a different time scale. The gate unit 50 may be any appropriate circuit designed to respond to the first of the vertical synchronizing pulses present in the composite synchronizing waveform and to provide as an output, those pulse components which exist during the time of application of the gating signal.

A matched filter 52 is coupled to receive the signal developed by the gate 50, and is operated under control of the Q signal developed at terminal 42 and applied as shown in FIG. 5(*u*). A threshold circuit 54 is included and arranged to provide a first output to a sampling circuit 56 and a second output to a sampling circuit 58. In particular, the output provided the unit 56 is a signal indicative of the presence of pulses in the signal from filter 52 which exceed a predetermined threshold, while the signal applied to the unit 58 is indicative of the presence of pulses which do not exceed that level. As shown, both the sampling units 56 and 58 are controlled by the S signal developed by the differentiating circuit 46 and applied to each of the units 56, 58 in the manner shown by the waveform of FIG. 5(*v*). The output of the sampler 56 is denoted by the reference "R" to indicate the presence of a pulse and corresponds-as will be seen below-to waveforms (*d*) and (*f*) of FIG. 3 for the "ODD" and "EVEN" interlaced television fields, respectively. Similarly, the output of the sampler 58 is denoted by the reference "*r*" and is of the form illustrated by waveforms ($e$) and ($g$) of FIG. 3 for those same two interlaced fields.

In operation, the output of the unit 50 to which the composite synchronizing signals are applied to be gated with the signal G will be seen to include the leading and trailing edges of each "A" and "B" synchronizing pulse on the "ODD" and "EVEN" interlaced fields in response to the internal mixing of unit 50. The pulses so recovered are coupled to the filter 52-which typically may comprise an integrator circuit which is controlled by the Q pulse to delete the leading edge pulse from those applied, as by quenching the integrating circuit to a zero value at that time. The trailing edge pulses so obtained are then coupled to the threshold 54 which has been set to provide an output to sampler 56 in response to the trailing edge pulses having energies above the predetermined value. Those pulses obtained through the mixing of the G pulse with the equalizing pulses of the composite waveform are of much lower energy content, and are therefore coupled by the threshold control 54 to the sampler 58 as their value does not exceed the preset level. The sampling pulse S shown in waveform ($v$) of FIG. 5 gates those pulses through the respective units 56 and 58 which occur in time synchronism with the sampling. It will be appreciated-and will be seen from the waveforms ($d$) -($g$) of FIG. 3-that the "R" signal from the sampler 56 comprise pulses substantially in time synchronism with the trailing edge of the serrated vertical synchronizing pulse while the "$r$" signal comprises pulses substantially in time synchronism with the equalizing pulse and horizontal synchronizing pulse of the composite signal. Having thus obtained the "R" and "$r$" pulse trains, the apparatus of FIG. 6 now operates on these signals to develop the "flag" signal during slot 4 of the "ODD" interlaced field.

Figure 6:
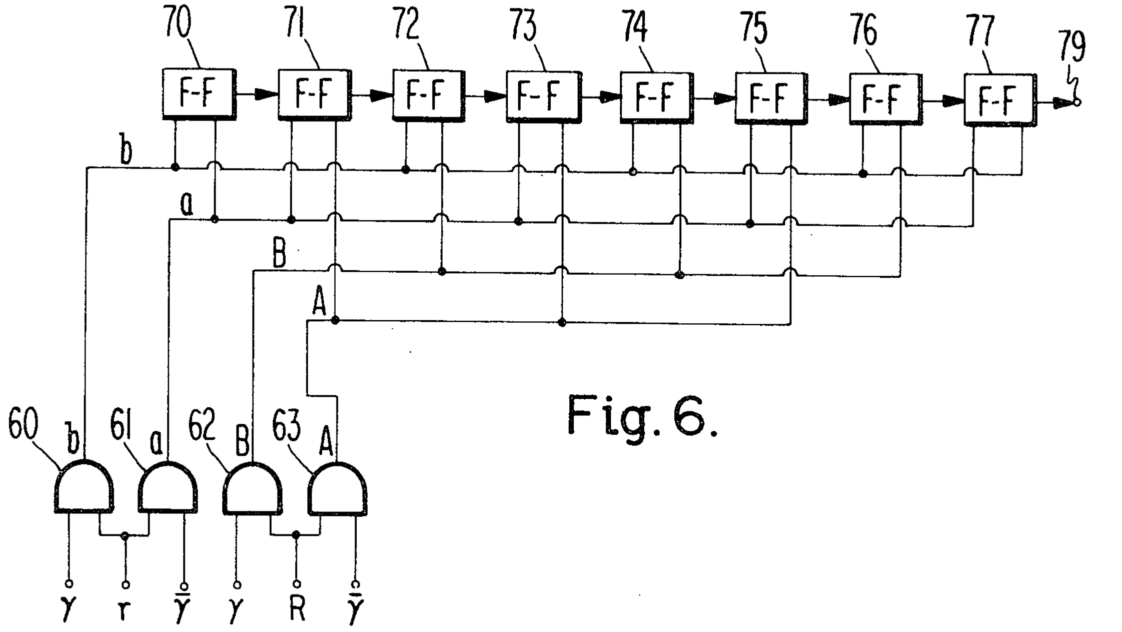
FIG. 6 is a digital logic diagram of one illustrative embodiment of the invention for generating a "flag" signal from the television signal itself for use on the "ODD" interlaced field in obtaining reliable message line selection.

In FIG. 6, four AND-circuits 60–63 and eight counter or flip-flop circuits 70–77 are shown. In particular, AND-circuit 60 receives a pair of input signals, one of which is developed at terminal 22 of FIG. 4 of the $\gamma$ waveform shown either in FIG. 5($f$) or FIG. 3($h$) and a second of which is developed by the sampler unit 58 of that drawing, of the "$r$" form shown in FIG. 3, waveforms ($e$) and ($g$). The output of this unit 60 is of the form shown in FIG. 3($q$) and 3($s$) for the "ODD" and "EVEN" television fields, and indicates the absence of the "B" synchronizing pulse, or the presence of the "$b$" pulse. In like manner, the AND-circuit 61 is supplied with the input from the inverter circuit 25 of FIG. 4, of the form shown either in FIG. 5($e$) or FIG. 3($i$), together with the "$r$" signal from unit 58 to provide an output of the form shown in FIG. 3($m$) and 3($o$) on the interlaced fields to indicate the absence of the "A" synchronizing pulse or the presence of the "$a$" pulse. The AND-circuits 62 and 63 similarly receive the "R" pulse developed by the sampler unit 56 as shown in FIG. 3, waveforms ($d$) and ($f$) along with the $\gamma$ gate developed at terminal 22 and the $\bar{\gamma}$ gate developed by inverter 25, respectively. These AND-units 62, 63 operate to provide an output signal of the form shown in FIG. 3 waveforms ($p$) and ($r$) as the presence of the "B" pulse and in FIG. 3 waveforms ($l$) and ($n$) indicating the presence of the "A" pulse, respectively. As shown, each of these $b$, $a$, B and A signals are coupled to the register flip-flop circuits 70–77.

For the example selected to illustrate the operation of the FIG. 6 apparatus namely, the development of a "flag" signal in the fourth slot of the "ODD" interlaced field the interconnections of the flip-flops 70–77 are designed to sense the presence in the "ODD" field composite synchronizing signal of the pulse sequence $b$ A B A B A B $a$. Such a sequence is represented in the waveforms of FIG. 3 by those pulses which are circled in the latter portions of the curves and in response to such pulse train occurrence, the flip-flop unit 77 operates to deliver an output pulse at its terminal 79. In operation, presence of the absence indicating "$b$" pulse sets flip-flop 70 in its proper state as to condition the following unit 71 for receipt of the following "A" pulse in the desired sequence. Such setting of flip-flop 71, in turn, conditions the unit 72 for proper setting and acceptance of the next following "B" pulse, and so forth down the line until the presence of the "$a$" pulse at flip-flop 77 serves to develop the output signal. Absence of any such pulse in the sequence or the occurrence of any undesired pulse will be noted to change at least the stage of its associated flip-flop circuit so as to cause such resetting as will eventually disable the translation through the flip-flop chain. With such translation interrupted, it will be seen that the "-flag" signal desired to be developed by flip-flop 77 will be inhibited from doing so. Thus, only upon the actual occurrence of the desired $b$ A B A B A B $a$ sequence will a "flag" ever be developed. Since this "flag" signal will be relatively fixed with respect to the horizontal synchronizing rate pulses which serve to generate it, the output signal developed will be substantially independent of tolerance variations for the leading edge of the vertical synchronizing pulse and, at the same time, to its one-half H line differences between successive interlaced fields. Such obtained "flag" signal can then be used in the same manner as described in my copending application Ser. No. 82,593, to provide a stable timing reference from which to count and thereby aid in correct message line selection in a manner to eliminate undesired streaking in the reproduced picture or the undesired reproduction of incorrect messages, as the case may be. While this scheme is effective in detecting the presence of the $b$ A B A B A B $a$ sequence, it will be apparent that analogous flip-flop interconnections can be made to detect the $a$ B A B A B A $b$ sequence for providing the "-flag" signal on an "EVEN" interlaced field.

With such an arrangement as herein described, it becomes unnecessary to first obtain approval from such agencies as the Federal Communications Commission before transmitting an additional "flag" signal during the primary broadcast signal to enable reliable message selection to occur. With the arrangement as described, it is only necessary to digitally operate on the incoming broadcast signals for alternate television fields to generate the internally desired locking signal. With such arrangement, it can be seen that the position within the television frame into which the "flag" signal is to be inserted can be governed merely by the number of flip-flop units included in its described processing chain and by the various interconnections of those units so as to sense the presence of pulses for either the "ODD" or "EVEN" interlaced fields. Other logic implementations will also be seen to be evident in constructing such arrangements as are characterized herein.

What is claimed is:

1. In a television system of the type wherein message information is multiplexed between predetermined line scanning rate pulses of a broadcast signal to provide an auxiliary transmission service which is in addition to that provided the picture tube of the receiver employed in such system, wherein said broadcast signal comprises at least two alternating interlaced fields containing a serrated field scanning rate pulse in addition to said line scanning rate pulses, wherein the timing of the leading edge of said serrated field scanning rate pulse differs with respect to the timing of said line scanning rate pulses on alternate ones of said two interlaced fields, and wherein means are included for reliably mixing said multiplexed broadcast signal with a gating signal timed to substantially coincide with the presence of said message information under the control of a reference timing signal for the subsequent recovery and reproduction of said information, apparatus for generating said reference timing signal comprising:

first means supplying an input signal representative of said broadcast signal and including at least a first pulse train corresponding to the line scanning rate pulses of said broadcast signal and a second pulse train corresponding to the serrated field scanning rate pulses thereof;

second means responsive to said input signal for providing first output pulses substantially in time synchronism with a first set of alternating pulses of said second pulse train on one of said two interlaced fields;

third means responsive to said input signal for providing second, different output pulses substantially in time synchronism with a second set of alternating pulses of said second pulse train on said one of said two interlaced fields;

fourth means for arranging said first and second output pulses in orderly time sequence; and register means responsive to the application of said time sequenced pulses to its input terminal to provide said reference timing signal as an output thereof when said sequence is effective to place said register means in a predetermined state of conduction.

2. The apparatus of claim 1 wherein said broadcast signal comprises an "EVEN" interlaced television field signal and an "ODD" interlaced television field signal, each of which contain equalizing pulses in addition to said scanning rate pulses, wherein said first means additionally supplies at least a third pulse train corresponding to said equalizing pulses, wherein there is additionally included fifth means responsive to said input signal for providing third output pulses substantially in time synchronism with a first set of alternating pulses of said third pulse train on said one of said two interlaced fields, wherein there is further included sixth means responsive to said input signal for providing fourth output pulses substantially in time synchronism with a second set of alternating pulses of said third pulse train on said one of said two interlaced fields, wherein said forth means additionally arranges said third and fourth output pulses in orderly time sequence with said first and second output pulses, and wherein said register means responds to the application of said time sequenced pulses to its input terminal to provide said reference timing signal only when said sequence, including said third and fourth output pulses, is effective to place said counter in its predetermined state of conduction.

3. The apparatus of claim 2 wherein said first set of alternating pulses of said second pulse train is representative as "A," wherein said second, different set of alternating pulses of said second pulse train is representative as "B," wherein said first set of alternating pulses of said third pulse train is representative as "*b*," wherein said second set of alternating pulses of said third pulse train is representative as "*a*," and wherein said register means develops said reference timing signal when said fourth means arranges said first, second, third and fourth output pulses in a timing sequence in which said "*b*" pulses precede the first of said "A" pulses, said "B" pulses interleave with said "A" pulses and said "*a*" pulses follow the last of said "B" pulses.

4. The apparatus of claim 2 wherein said first set of a alternating pulses of said second pulse train is representative as "A," wherein said second, different set of alternating pulses of said second pulse train is representative as "B," wherein said first set of alternating pulses of said third pulse train is representative as "*b*," wherein said second set of alternating pulses of said third pulse train is representative as "*a*," and wherein said register means develops said reference timing signal when said fourth means arranges said first, second, third and fourth output pulses in a timing sequence in which said "*a*" pulses precede the first of said "B" pulses, said "A" pulses interleave with said "B" pulses and said "*b*" pulses follow the last of said "A" pulses.

5. In a television system transmitting a broadcast signal comprising at least two alternating interlaced fields containing line scanning rate pulses and a serrated field scanning rate pulse, and wherein the timing of the leading edge of said serrated field-scanning rate pulse differs with respect to the timing of said line-scanning rate pulses on alternate ones of said two interlaced fields, apparatus for generating a reference signal which reliably coincides in time with a predetermined interval between successive line-scanning rate pulses within one interlaced field comprising:

first means supplying an input signal representative of said broadcast signal and including at least a first pulse train corresponding to the line-scanning rate pulses of said broadcast signal and a second pulse train corresponding to the serrated field scanning rate pulses thereof;

second means responsive to said input signal for providing first output pulses substantially in time synchronism with a first set of alternating pulses of said second pulse train on one of said two interlaced fields;

third means responsive to said input signal for providing second, different output pulses substantially in time synchronism with a second set of alternating pulses of said second pulse train on said one of said two interlaced fields;

fourth means for arranging said first and second output pulses in orderly time sequence; and register means responsive to the application of said time sequenced pulses to its input terminal to provide said reference timing signal as an output thereof when said sequence is effective to place said register means in a predetermined state of conduction.

* * * * *

UNITED STATES PATENT OFFICE

CERTIFICATE OF CORRECTION

Patent No. 3,649,750 Dated March 14, 1972

Inventor(s) J. James Gibson

It is certified that error appears in the above-identified patent and that said Letters Patent are hereby corrected as shown below:

Column 4, Line 75 - change "$Q=1=(1-q)^6(1-p)^2$" to -- $Q=1-(1-q)^6(1-p)^2$ --.

Column 5, Line 15 - change "bock" to -- block --.

Column 5, Line 72 - change "$\gamma$" to -- $a$ --.

Column 7, Line 44 - after "the" insert -- $\bar{\gamma}$ --.

Signed and sealed this 24th day of October 1972.

(SEAL)
Attest:

EDWARD M.FLETCHER,JR.
Attesting Officer

ROBERT GOTTSCHALK
Commissioner of Patents